US008259246B2

(12) United States Patent
Yamashita

(10) Patent No.: US 8,259,246 B2
(45) Date of Patent: Sep. 4, 2012

(54) ACTIVE MATRIX SUBSTRATE, LIQUID CRYSTAL PANEL, LIQUID CRYSTAL DISPLAY APPARATUS, TELEVISION RECEIVER, AND A METHOD FOR MANUFACTURING ACTIVE MATRIX SUBSTRATE

(75) Inventor: Yuki Yamashita, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 248 days.

(21) Appl. No.: 12/745,821

(22) PCT Filed: Aug. 27, 2008

(86) PCT No.: PCT/JP2008/065330
§ 371 (c)(1),
(2), (4) Date: Jun. 2, 2010

(87) PCT Pub. No.: WO2009/072329
PCT Pub. Date: Jun. 11, 2009

(65) Prior Publication Data
US 2010/0265411 A1    Oct. 21, 2010

(30) Foreign Application Priority Data

Dec. 3, 2007    (JP) .................................. 2007-312765

(51) Int. Cl.
*G02F 1/1343*    (2006.01)
(52) U.S. Cl. ............................... 349/39; 349/43; 349/54
(58) Field of Classification Search .................... 349/38, 349/39, 54
See application file for complete search history.

(56) References Cited

U.S. PATENT DOCUMENTS

| 6,147,722 | A  | * | 11/2000 | Shimada et al. ................ 349/43 |
| 6,259,494 | B1 |   | 7/2001  | Kawai et al. |
| 6,839,099 | B2 | * | 1/2005  | Fukunishi ........................ 349/54 |
| 7,330,222 | B2 | * | 2/2008  | Shiraki et al. ................... 349/54 |
| 2001/0022366 | A1 | | 9/2001 | Kawai et al. |

FOREIGN PATENT DOCUMENTS

| JP | 10-123563 A | 5/1998 |
| JP | 11-38449 A | 2/1999 |
| WO | WO 2007/043399 A1 | 4/2007 |

* cited by examiner

*Primary Examiner* — Richard Kim
(74) *Attorney, Agent, or Firm* — Birch, Stewart, Kolasch & Birch, LLP

(57) ABSTRACT

Each retention capacitor line has retention capacitor line extension (18*s*) extending from an intersection of a retention capacitor line (18A) and a data signal line (15*a*) toward each of two intersections of the data signal line (15*a*) and two scanning signal lines (16*a* and 16*b*) adjacent to the retention capacitor line. The retention capacitor line extension (18*s*) has a part (M3) where the retention capacitor line extension (18*s*) and the data signal line (15*a*) overlap each other. A retention capacitor line sub-extension (18*c*) further extended from the retention capacitor line extension (18*s*) has a part (M4) where the retention capacitor line sub-extension (18*c*) and a drain drawing line (19*a*) overlap each other. On at least one side of an opening (K) of the scanning signal line (16*b*), the scanning signal line (16*b*) functions as a gate electrode (10*a*) of a transistor (12*a*).

5 Claims, 4 Drawing Sheets

ACTIVE MATRIX SUBSTRATE, LIQUID CRYSTAL PANEL, LIQUID CRYSTAL DISPLAY APPARATUS, TELEVISION RECEIVER, AND A METHOD FOR MANUFACTURING ACTIVE MATRIX SUBSTRATE

TECHNICAL FIELD

The present invention relates to an active matrix substrate which allows correction of a break of a data signal line, and to a liquid crystal panel or the like using the active matrix substrate.

BACKGROUND ART

FIG. 5 shows an arrangement of a conventional active matrix substrate 905 having a multi-pixel structure (i.e., active matrix substrate 905 of a pixel division method).

As illustrated in FIG. 5, the active matrix substrate 905 has data signal lines 915 extending in a column direction Y, scanning signal lines 916 extending in a line direction X, retention capacitor lines 918 extending in the line direction X, and pixel regions 903 defined by the data signal lines 915 and the scanning signal lines 916.

Each of the retention capacitor lines 918 centrally crosses corresponding pixel regions 903. In each of the pixel regions 903, a transistor 912 and a pixel electrode 917 are formed.

Specifically, in each of the pixel regions 903, a source electrode 908 of the transistor 912 is connected with a corresponding data signal line 915, and a drain electrode 909 of the transistor 912 is connected with a corresponding pixel electrode 917 via a contact hole 911.

A corresponding scanning signal line 916 serves as a gate electrode of the transistor 912.

As mentioned earlier, each of the retention capacitor lines 918 and a corresponding pixel electrode 917 overlap each other. As a result, a retention capacitor is formed between each of the retention capacitor lines 918 and a corresponding pixel electrode 917.

In a liquid crystal display apparatus having the active matrix substrate 905, a part corresponding to each of the pixel regions 903 is one pixel. In the liquid crystal display apparatus, a signal potential is supplied from each of the data signal lines 915 to a corresponding pixel electrode 917.

In the active matrix substrate 905 illustrated in FIG. 5, spare lines are provided so that a defect such as a break of a data signal line 915 may be corrected. The following describes this.

In the active matrix substrate 905, retention capacitor line extensions 918s are provided so as to extend from an intersection RC1 of a corresponding retention capacitor line 918 and a corresponding data signal line 915 toward each of intersections RC2 and RC3, which are adjacent to the intersection RC1, of the data signal line 915 and two scanning signal lines 916.

Specifically, the two retention capacitor line extensions 918s are provided so as to extend, along the data signal line 915, from the intersection RC1 lying substantially on a halfway line of corresponding pixel regions 903, while leaving gaps on both sides of the data signal line 915 in planar view.

In addition, the two retention capacitor line extensions 918s are extended right before each of the intersections RC2 and RC3.

In other words, no retention capacitor line extension 918s intersects with any scanning signal line 916, and, in planer view, a constant gap is formed between a tip of each retention capacitor line extension 918s and a corresponding scanning signal line 916. This is because, in general, the retention capacitor lines 918, the retention capacitor line extensions 918s, and the scanning signal lines 916 are formed at a same layer level.

Any two retention capacitor line extensions 918s which are provided along a corresponding data signal line 915 and on both sides thereof each have retention capacitor line extension projections 918sc which project toward the data signal line 915.

Each of the two retention capacitor line extension projections 918sc overlaps the data signal line 915 in planar view (See overlapping points P1, P2, P3, and P4 in FIG. 5).

Specifically, any two retention capacitor line extensions 918s sandwiching a corresponding data signal line 915 each have two retention capacitor line extension projections 918sc between corresponding intersections RC1 and RC2. That is, the two retention capacitor line extensions 918s have four retention capacitor line extension projections 918sc in total between the intersections RC1 and RC2.

Similarly, four retention capacitor line extension projections 918sc are also provided between corresponding intersections RC1 and RC3.

Two retention capacitor line extension projections 918sc are provided to one of two retention capacitor line extensions 918s which face each other across a corresponding data signal line 915 while the other two retention capacitor line extension projections 918sc are provided at substantially same positions of the other one of the two retention capacitor line extensions 918s. In other words, in a region where the data signal line 915 and two retention capacitor line extension projections 918sc which face each other across the data signal line 915 overlap each other, the two retention capacitor line extension projections 918sc overlap the data signal line 915 from both sides thereof.

In the active matrix substrate 905 illustrated in FIG. 5, the overlapping points formed between the intersections RC1 and RC2 are intersections P1 and P2 which lie in this order from the intersection RC1. On the other hand, the overlapping points formed between the intersections RC1 and RC3 are intersections P3 and P4 which lie in this order from the intersection RC1.

As described above, in the conventional active matrix substrate 905 illustrated in FIG. 5, each of the retention capacitor line extensions 918s is provided along a corresponding data signal line 915. Further, each of the retention capacitor line extensions 918s (retention capacitor line extension projections 918sc) and a corresponding data signal line 915 are provided so as to overlap each other.

Therefore, in a case where a data signal line 915 has a defect such as a break, the defect can be recovered (corrected) by using, as a bypass, a corresponding retention capacitor line extension 918s provided along the data signal line 915. That is, the retention capacitor line extension 918s is used as a so-called spare line so that a signal potential may be transmitted via the spare line. This makes it possible to supply the data signal to a part behind the break.

Patent Literature 1 can be taken as one of publicly-known documents related to the conventional active matrix substrate.

Citation List

Patent Literature 1

Japanese Patent Application Publication, Tokukaihei, No. 11-38449 A (Publication Date: Feb. 12, 1999)

SUMMARY OF INVENTION

The conventional active matrix substrate 905 has a problem in that only a small range of a data signal line 915 allows correction of a defect. In other words, a large range of the data signal line 915 does not allow correction of a defect. Therefore, there is a problem in that a defective active matrix substrate 905 is remedied at a low ratio.

That is, the active matrix substrate 905 only allows correction of a break etc. occurred on a data signal line 915 within a break correctable range RA. Therefore, it is not possible to correct a break etc. occurred on the data signal line 915 except in the break correctable range RA. That is, it is not possible to correct a break etc. occurred on a data signal line 915 in a break uncorrectable range RB which is illustrated in FIG. 5.

In general, the retention capacitor lines 918 and the scanning signal lines 916 are often provided at a same layer level. In this case, it is necessary to provide a wider gap between a tip 918st of each retention capacitor line extension and a corresponding scanning signal line 916. This is for prevention of a defect caused by a short-circuit between a retention capacitor line 918 and a corresponding scanning signal line 916.

Therefore, in an actual product, it is necessary to provide a wider gap between a tip 918st of each retention capacitor line extension and a corresponding scanning signal line 916. Accordingly, the break uncorrectable range RB is wide. As a result, a defective active matrix substrate 905 is remedied at a low ratio.

The present invention was made in view of the problem. An object of the present invention is to provide an active matrix substrate, a liquid crystal panel, a liquid crystal display apparatus, a television receiver, and a method for manufacturing an active matrix substrate each of which allows, in a wider range, correction of a break occurred on a data signal line.

In order to attain the object, an active matrix substrate of the present invention includes: scanning signal lines and retention capacitor lines both extending in a first direction; data signal lines extending in a second direction intersecting with the first direction; and pixel regions in each of which: a corresponding one of the scanning signal lines crosses the pixel region; at least one pixel electrode is provided on one of both sides, extending along a longitudinal direction of the corresponding one of the scanning signal lines, of the corresponding one of the scanning signal lines while at least one pixel electrode is provided on a counter side; and transistors are provided on the corresponding one of the scanning signal lines so as to correspond respectively to the pixel electrodes, wherein: each of the retention capacitor lines has a retention capacitor line extension extending along a corresponding one of the data signal lines from an intersection of this retention capacitor line and the corresponding one of the data signal lines toward each of two intersections of the corresponding one of the data signal lines and two scanning signal lines adjacent to this retention capacitor line; the retention capacitor line extension has a part where the retention capacitor line extension and the corresponding one of the data signal lines overlap each other in planar view; drain drawing lines are provided for electrically connecting drains of the transistors with the pixel electrodes, respectively; the retention capacitor line extension has a sub-extension extending toward a corresponding one of the drain drawing lines; the sub-extension has a part where the sub-extension and the corresponding one of the drain drawing lines overlap each other in planer view; each of the scanning signal lines has openings which positionally correspond respectively to the transistors provided to this scanning signal line, the openings each extending from an inside of a corresponding one of the pixel regions to an outside thereof beyond a corresponding one of the data signal lines; and on at least the one of both sides of each opening, each of the scanning signal lines has a part functioning as a gate electrode of a corresponding one of the transistors.

According to the arrangement, it is possible to easily correct a break occurred on a data signal line in the vicinity of a scanning signal line, even though it has been regarded that correction of such a break is difficult. The following describes the correction.

According to the arrangement, the retention capacitor line extensions are provided so as to each extend along a corresponding data signal line. Each of the retention capacitor line extensions has a sub-extension, extending toward a corresponding drain drawing line for electrically connecting a corresponding drain electrode and a corresponding pixel electrode.

Each of the retention capacitor line extensions has a part where the retention capacitor line extension and a corresponding data signal line overlap each other (i.e., has an overlapping point 1). Further, each of sub-extensions has a part where the sub-extension and a corresponding drain drawing line overlap each other (i.e., has an overlapping point 2).

Accordingly, in a case where a break is occurred on a data signal line between an intersection of the data signal line and a scanning signal line, and a corresponding overlapping point 1, the data signal line and a corresponding retention capacitor line extension are electrically connected with each other at the overlapping point 1. Further, a corresponding drain drawing line and a sub-extension extended from the retention capacitor line extension are electrically connected with each other at a corresponding overlapping point 2.

This makes it possible to form, as a bypass for the break of the data signal line, a route passing through the data signal line, the retention capacitor line extension, the sub-extension, the drain drawing line, a corresponding transistor, and the data signal line.

In addition, according to the arrangement, each of the scanning signal lines has the openings, and on at least one of both sides of each opening, each of the scanning signal lines has a part functioning as a gate electrode of a corresponding one of the transistors.

Therefore, even if one transistor is used as a transmission path of a data signal (i.e., as a part of the bypass) so that the bypass may be formed for correction of the break of the data signal line, the transistor can be electrically separated from the whole scanning signal line by cutting off the scanning signal line positionally corresponding to the transistor.

Further, according to the arrangement, each transistor is formed on one of both sides of a corresponding opening. Therefore, even if a scanning signal line positionally corresponding to a transistor is cut off, a scanning signal can be transmitted beyond the part cut off via the line on the other side of a corresponding opening (on a side where no cutting is performed). Therefore, even if a scanning signal line positionally corresponding to a transistor is cut off so that a break may be corrected, a scanning signal can be transmitted, in a normal fashion, to other transistors using the same scanning signal line as their gate electrodes.

The arrangement makes it possible to easily correct a break occurred on a data signal line in the vicinity of a scanning signal line which break has been difficult to correct.

Therefore, the arrangement makes it possible to provide an active matrix substrate which allows, in a wider range, correction of a break occurred on a data signal line.

The active matrix substrate of the present invention is preferably arranged such that in planar view, each of the retention capacitor line extensions and the corresponding one of the data signal lines overlap each other at least two different positions in a direction in which the data signal line extends.

According to the arrangement, each of the data signal lines has two different points in the direction in which the data signal line extends at each of which points the data signal line and a corresponding one of the retention capacitor line extensions overlap each other. Therefore, it is possible to correct not only a break occurred on a data signal line between a scanning signal line and a corresponding overlapping point 1 (a point where the retention capacitor line extension and the data signal line overlap each other) but also a break occurred on a data signal line between the two different points.

That is, in a case where a break occurs on a data signal line between the two different points, the data signal line and a corresponding retention capacitor line extension are electrically connected at the two different points where the data signal line and the retention capacitor line extension overlap each other. This makes it possible to use the retention capacitor line extension as a bypass for the broken data signal line between the two different points.

As a result, the arrangement makes it possible to broaden a range in which a break of a data signal line can be corrected.

A liquid crystal panel of the present invention preferably includes the active matrix substrate.

A liquid crystal display apparatus of the present invention preferably includes the liquid crystal panel.

A television receiver of the present invention preferably includes the liquid crystal display apparatus and a tuner section for receiving a television broadcast.

The arrangements make it possible to obtain a liquid crystal panel, a liquid crystal display apparatus, and a television receiver which are higher in productivity since the active matrix substrate to be used therein is high in yield.

In order to attain the object, a method of the present invention for manufacturing an active matrix substrate, the active matrix substrate including: scanning signal lines and retention capacitor lines both extending in a first direction; data signal lines extending in a second direction intersecting with the first direction; and pixel regions in each of which: a corresponding one of the scanning signal lines crosses the pixel region; at least one pixel electrode is provided on one of both sides, extending along a longitudinal direction of the corresponding one of the scanning signal lines, of the corresponding one of the scanning signal lines while at least one pixel electrode is provided on a counter side; and transistors are used as switching elements, the method includes the steps of: providing, to each of the retention capacitor lines, a retention capacitor line extension so that the retention capacitor line extension is extended along a corresponding one of the data signal lines from an intersection of this retention capacitor line and the corresponding one of the data signal lines and so that the retention capacitor line extension has a part where the retention capacitor line extension and the corresponding one of the data signal lines overlap each other; further providing, to the retention capacitor line extension, a sub-extension so that the sub-extension is extended toward a corresponding one of drain drawing lines each extending from a drain electrode of a corresponding one of the transistors, and so that the sub-extension has a part where the sub-extension and the corresponding one of the drain drawing lines overlap each other; and providing, to each of the scanning signal lines, openings each extending from an inside of a corresponding one of the pixel regions to an outside thereof beyond a corresponding one of the data signal lines and providing, at least the one of both sides of each opening, a part functioning as a gate electrode of a corresponding one of the transistors, and: in a case where one of the data signal lines is disconnected between a source electrode of one of the transistors and a part where a corresponding one of retention capacitor line extensions and this data signal line overlap each other, cutting this retention capacitor line extension between the retention capacitor line of this retention capacitor line extension and the part where this retention capacitor line extension and this data signal line overlap each other, so that this retention capacitor line is electrically separated from the part where this retention capacitor line extension and this data signal line overlap each other; cutting the drain drawing line of this transistor between the pixel electrode connected to this drain drawing line and the part where this drain drawing line and this retention capacitor line extension overlap each other; cutting the scanning signal line corresponding to this transistor at two positions corresponding to the opening corresponding to this transistor so that this transistor is electrically separated from this scanning signal line while the electrical connection between the source electrode of this transistor and this data signal line is maintained; electrically connecting this retention capacitor line extension and this data signal line in the part where this retention capacitor line extension and this data signal line overlap each other; electrically connecting the sub-extension of this retention capacitor line extension and this drain drawing line in the part where this sub-extension and this drain drawing line overlap each other; electrically connecting the drain electrode and the gate electrode of this transistor in a part where the drain electrode and the gate electrode overlap each other; and electrically connecting the source electrode and the gate electrode of this transistor in a part where the source electrode and the gate electrode overlap each other.

The method makes it possible to form a bypass for the broken data signal line in a case where the data signal line is broken between the source electrode of the transistor, and the part where the retention capacitor line extension and the data signal line overlap each other.

That is, the data signal line and the retention capacitor line extension are electrically connected with each other in the part point where they overlap each other (connection point 1); the sub-extension and the drain drawing line are electrically connected with each other in the part where they overlap each other (connection point 2); the drain electrode and the gate electrode are electrically connected with each other in the part where they overlap each other (connection point 3); and the source electrode and the gate electrode are electrically connected with each other in the part where they overlap each other (connection point 4).

This makes it possible to transmit a data signal via the bypass in order of: the data signal line, the connection point 1, the retention capacitor line extension, the sub-extension, the connection point 2, the drain drawing line, the drain electrode, the connection point 3, the gate electrode, the connection point 4, the source electrode, and the data signal line.

Further, the method makes it possible to electrically isolate the bypass formed as above from other lines.

That is, cut are (i) the retention capacitor line extension between the retention capacitor line and the connection point 1 and (ii) the drain drawing line between the connection point 2 and the pixel electrode. In addition, the scanning signal line is cut at two positions corresponding to the opening so that the connection points 3 and 4 are isolated from the scanning signal line.

This makes it possible to reduce an effect of correction of a break of a data signal line on other areas of the active matrix substrate.

Therefore, the method makes it possible to provide a method for manufacturing an active matrix substrate which allows, in a wider range, a break occurred on a data signal line.

As described above, an active matrix substrate of the present invention is arranged such that each of the retention capacitor lines has a retention capacitor line extension extending along a corresponding one of the data signal lines from an intersection of this retention capacitor line and the corresponding one of the data signal lines toward each of two intersections of the corresponding one of the data signal lines and two scanning signal lines adjacent to this retention capacitor line; the retention capacitor line extension has a part where the retention capacitor line extension and the corresponding one of the data signal lines overlap each other in planar view; drain drawing lines are provided for electrically connecting drains of the transistors with the pixel electrodes, respectively; the retention capacitor line extension has a sub-extension extending toward a corresponding one of the drain drawing lines; the sub-extension has a part where the sub-extension and the corresponding one of the drain drawing lines overlap each other in planer view; each of the scanning signal lines has openings which positionally correspond respectively to the transistors provided to this scanning signal line, the openings each extending from an inside of a corresponding one of the pixel regions to an outside thereof beyond a corresponding one of the data signal lines; and on at least the one of both sides of each opening, each of the scanning signal lines has a part functioning as a gate electrode of a corresponding one of the transistors.

Further, a method of the present invention for manufacturing an active matrix substrate includes the steps of: providing, to each of the retention capacitor lines, a retention capacitor line extension so that the retention capacitor line extension is extended along a corresponding one of the data signal lines from an intersection of this retention capacitor line and the corresponding one of the data signal lines and so that the retention capacitor line extension has a part where the retention capacitor line extension and the corresponding one of the data signal lines overlap each other; further providing, to the retention capacitor line extension, a sub-extension so that the sub-extension is extended toward a corresponding one of drain drawing lines each extending from a drain electrode of a corresponding one of the transistors, and so that the sub-extension has a part where the sub-extension and the corresponding one of the drain drawing lines overlap each other; and providing, to each of the scanning signal lines, openings each extending from an inside of a corresponding one of the pixel regions to an outside thereof beyond a corresponding one of the data signal lines and providing, at least one of both sides of each opening, a part functioning as a gate electrode of a corresponding one of the transistors, and: in a case where one of the data signal lines is disconnected between a source electrode of one of the transistors connected thereto and a part where a corresponding one of retention capacitor line extensions and this data signal line overlap each other, cutting this retention capacitor line extension between the retention capacitor line of this retention capacitor line extension and the part where this retention capacitor line extension and this data signal line overlap each other, so that this retention capacitor line is electrically separated from the part where this retention capacitor line extension and this data signal line overlap each other; cutting the drain drawing line of this transistor between the pixel electrode connected to this drain drawing line and the part where this drain drawing line and this retention capacitor line extension overlap each other; cutting the scanning signal line corresponding to this transistor at two positions corresponding to the opening corresponding to this transistor so that this transistor is electrically separated from this scanning signal line while the electrical connection between the source electrode of this transistor and this data signal line is maintained; electrically connecting this retention capacitor line extension and this data signal line in the part where this retention capacitor line extension and this data signal line overlap each other; electrically connecting the sub-extension of this retention capacitor line extension and this drain drawing line in the part where this sub-extension and this drain drawing line overlap each other; electrically connecting the drain electrode and the gate electrode of this transistor in a part where the drain electrode and the gate electrode overlap each other; and electrically connecting the source electrode and the gate electrode of this transistor in a part where the source electrode and the gate electrode overlap each other.

This makes it possible to correct, in a wider range, a break occurred on a data signal line.

BRIEF DESCRIPTION OF DRAWINGS

FIG. 1 is a plan view illustrating an arrangement of an active matrix substrate of an embodiment of the present invention.

FIG. 2 is a cross-sectional view taken along a line A-A in FIG. 1.

FIG. 3 is a cross-sectional view taken along a line B-B in FIG. 1.

FIG. 4 is a block diagram illustrating an arrangement of a liquid crystal display apparatus and a television receiver of the present invention.

FIG. 5 is a plan view illustrating an arrangement of an active matrix substrate of a conventional art.

REFERENCE SIGNS LIST

Figure 1:
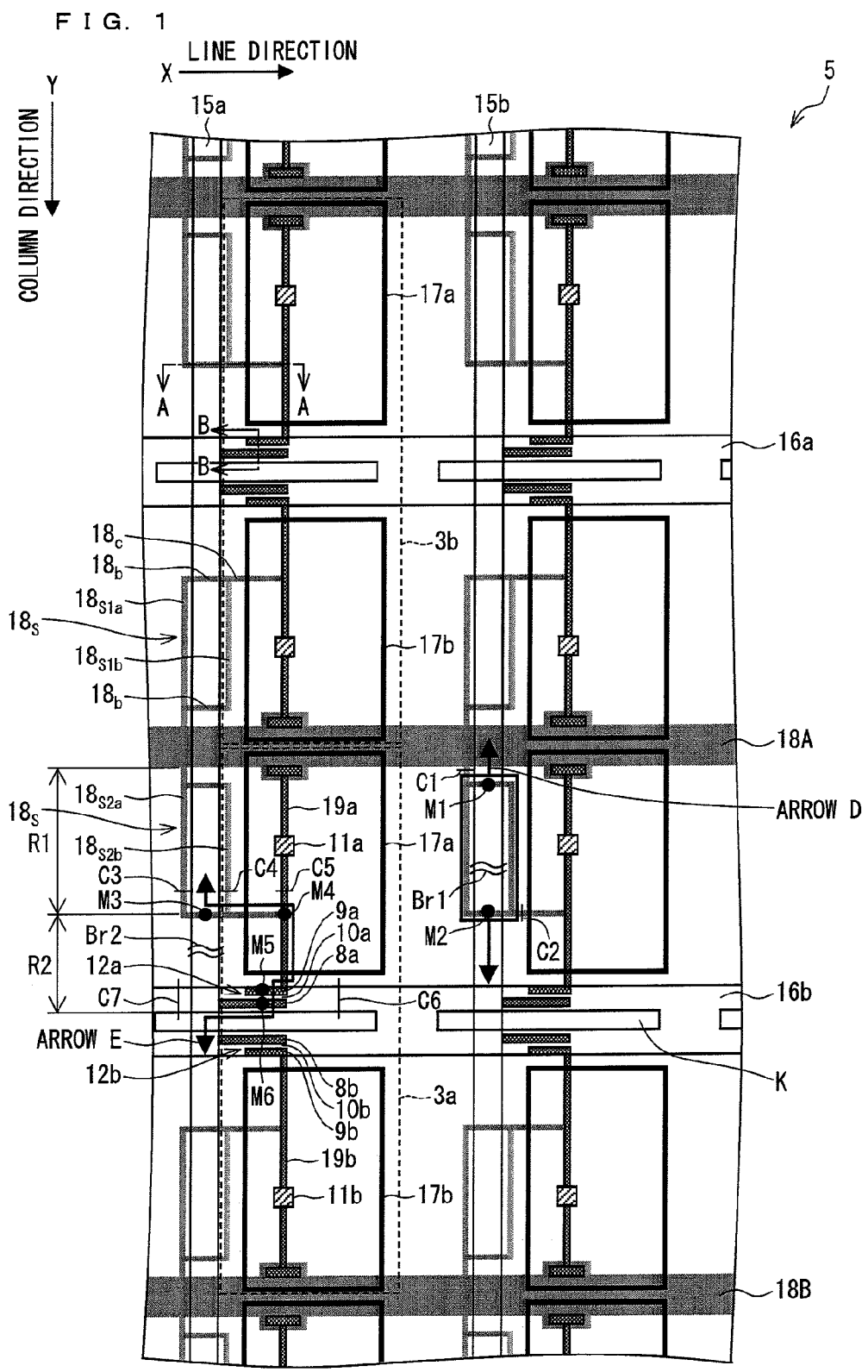
FIG. 1

5 Active matrix substrate
8 Source electrode
9 Drain electrode
10 Gate electrode
12 Transistor
15 Data signal line
16 Scanning signal line
17 Pixel electrode
18 Retention capacitor line
18s Retention capacitor line extension
18b Retention capacitor line overpass (retention capacitor line extension)
18c Retention capacitor line sub-extension (sub-extension)
19 Drain drawing line
60 Liquid crystal panel
70 Liquid crystal display apparatus
75 Tuner section
80 Television receiver
K Opening
Br2 Broken point
C3 Cutting point
C4 Cutting point
C5 Cutting point
C6 Cutting point
C7 Cutting point
M3 Melt connection point
M4 Melt connection point
M5 Melt connection point
M6 Melt connection point

DESCRIPTION OF EMBODIMENTS

The following describes an embodiment of the present invention. Members which are common in function between arrangements (figures) are given common reference signs, and descriptions of such members are not repeated.

FIG. 1 illustrates an arrangement of an active matrix substrate 5 of the present embodiment.

(Data Signal Line, Scanning Signal Line, and Retention Signal Line)

As illustrated in FIG. 1, the active matrix substrate 5, which is a substrate of a pixel division method, includes data signal lines 15 (15a and 15b) extending in a column direction Y, scanning signal lines 16 (16a and 16b) extending in a line direction X, retention capacitor lines 18 (18A and 18B) extending in the line direction X, and pixel regions 3 arranged in a matrix pattern. Each of the data signal lines 15 intersects with each of the retention capacitor lines 18 and each of the scanning signal lines 16 via an insulating layer (not illustrated).

(Pixel Region)

Specifically, each of the scanning signal lines 16 centrally crosses corresponding pixel regions 3. Each pixel region 3 includes a first transistor 12a, a second transistor 12b, a first pixel electrode 17a, and a second pixel electrode 17b.

In planar view, the first pixel electrode 17a and the retention capacitor line 18A are provided on one side of a corresponding scanning signal line 16 while the second pixel electrode 17b and the retention capacitor line 18B are provided on the other side.

(Transistor: Source)

The following describes the transistors.

In each of the pixel regions 3, a source electrode 8a of the first transistor 12a and a source electrode 8b of the second transistor 12b are connected with a corresponding data signal line 15.

(Transistor: Drain)

A drain electrode 9a of the first transistor 12a is connected with the first pixel electrode 17a via a contact hole 11a provided to a first drain drawing line 19a extended from the drain electrode 9a.

As is the case with the first transistor 12a, a drain electrode 9b of the second transistor 12b is connected with the second pixel electrode 17b via a contact hole 11b provided to a second drain drawing line 19b.

(Transistor: Gate)

As for the first transistor 12a and the second transistor 12b, a corresponding scanning signal line 16 serves as a gate electrode 10 (10a and 10b) shared between the first transistor 12a and the second transistor 12b.

(Opening of Gate)

In the active matrix substrate 5 of the present embodiment, each of the scanning signal lines 16 has openings K. The openings K refer to removed parts of each of the scanning signal lines 16. The following describes the openings K.

As illustrated in FIG. 1, in the active matrix substrate 5 of the present embodiment, each of the scanning signal lines 16 has rectangular cutouts which positionally correspond respectively to the transistors 12 provided to the scanning signal line 16. The rectangular cutouts extend parallel with the line direction X, which is a direction in which the scanning signal lines 16 extend. That is, the scanning signal lines 16 made of a metal each have the openings K which are substantially rectangular regions where no metal is provided.

More specifically, in the embodiment illustrated in FIG. 1, each of the openings K is formed from the outside of a corresponding pixel region 3 to the inside thereof.

In that region of each pixel region 3 in which transistors 12 are provided, a corresponding scanning signal line 16 has two regions on both sides of a corresponding opening K, respectively. The two regions function as gate electrodes 10 of transistors 12a and 12b.

(Retention Capacitor Line)

The following describes the retention capacitor lines 18.

As illustrated in FIG. 1, the retention capacitor line 18A in the present embodiment overlaps the second pixel electrode 17b which belongs to the pixel region 3a and also overlaps the first pixel electrode 17a which belongs to the pixel region 3b which is a pixel region adjacent to the pixel region 3a.

A retention capacitor is formed in each of the overlapping regions. Specifically, a second retention capacitor is formed between the retention capacitor line 18A and the second pixel electrode 17b while a first retention capacitor is formed between the retention capacitor line 18A and the first pixel electrode 17a.

(Multi-pixel Structure)

The following describes a multi-pixel structure.

In the liquid crystal display apparatus having the active matrix substrate 5, a region corresponding to one pixel region 3 is one pixel, and in each pixel, a first sub-pixel is formed so as to contain the first pixel electrode 17a while a second sub-pixel is formed so as to contain the second pixel electrode 17b.

In the liquid crystal display apparatus, a same signal potential (electric potential corresponding to a data signal) is supplied from each data signal line 15 to corresponding first and second pixel electrodes 17a and 17b. However, by separately controlling respective electric potentials of the retention capacitor lines 18A and 18B (e.g., in such a manner that one electric potential overshoots while the other undershoots), it is possible to control, via the first retention capacitor and the second retention capacitor, the first pixel electrode 17a and the second pixel electrode 17b so that they have different electric potentials.

In the liquid crystal display apparatus, this allows a high-brightness sub-pixel (bright sub-pixel) and a low-brightness sub-pixel (dark sub-pixel) to constitute one pixel so that a halftone may be expressed. As a result, it is possible to improve viewing angle dependence of a γ characteristic (e.g., excess brightness on a display screen).

(Retention Capacitor Line)

The following describes, in detail, features of the retention capacitor lines 18 of the active matrix substrate 5 of the present embodiment.

In the present embodiment, each of the retention capacitor lines 18 has a part extended in the line direction X and, in addition, has retention capacitor line extensions 18s extended in a direction parallel to the data signal lines 15, i.e., in the column direction Y.

In addition, in the present embodiment, each of the retention capacitor lines 18 has retention capacitor line sub-extensions 18c each extended from a corresponding retention capacitor line extension 18s to a corresponding drain drawing line 19. The following describes this concretely.

(Retention Capacitor Line Extension)

The following first describes the retention capacitor line extensions 18s.

Each of the retention capacitor line extensions 18s is extended, from an intersection of a corresponding retention capacitor line 18 and a corresponding data signal line 15, along the data signal line 15, in each of two directions in which the data signal line 15 extends.

That is, two retention capacitor line extensions 18s are extended from the intersection of the retention capacitor line 18 (18A) and the data signal line 15 (15a) in respective two opposite directions, i.e., toward two intersections of the data signal line 15 and two adjacent scanning signal lines 16 (i.e., intersections of the data signal line 15a and the scanning signal lines 16a and 16b).

That is, referred to as a first retention capacitor line extension 18s1 is a retention capacitor line extended, from the intersection of the data signal line 15a and the retention capacitor line 18A, toward the intersection of the data signal line 15a and the scanning signal line 16a.

Similarly, referred to as a second retention capacitor line extension 18s2 is a retention capacitor line extended, from the intersection of the data signal line 15a and the retention capacitor line 18A toward the intersection of the data signal line 15a and the scanning signal line 16b.

(Parallel Extension)

The retention capacitor line extension 18s1 has, as its main parts, first retention capacitor line extensions 18s1a and 18s1b. In planar view, the first retention capacitor line extensions 18s1a and 18s1b are extended in parallel along both sides of the data signal line 15 while leaving a constant gap on both sides of the data signal line 15. Similarly, the retention capacitor line extension 18s2 has, as its main parts, first retention capacitor line extensions 18s2a and 18s2b. In planar view, the first retention capacitor line extensions 18s2a and 18s2b are extended in parallel along both sides of the data signal line 15 while leaving a constant gap on both sides of the data signal line 15.

In other words, in a region where a retention capacitor line extension 18s is provided, a corresponding data signal line 15 is sandwiched between corresponding first retention capacitor line extensions 18s1a and 18s1b, and sandwiched between a corresponding second retention capacitor line extensions 18s2a and 18s2b.

(Overpass)

The first retention capacitor line extensions 18s1a and 18s1b are connected with each other by retention capacitor line overpasses 18b which are line parts straddling the data signal line 15 in planar view. Similarly, the second retention capacitor line extensions 18s2a and 18s2b are connected with each other by retention capacitor line overpasses 18b which are line parts straddling the data signal line 15 in planar view.

Specifically, in the present embodiment, the first retention capacitor line extension 18s1a and the first retention capacitor line extension 18s1b are connected at two positions: at one position close to the retention capacitor line 18 and at one tip section of the retention capacitor line extension 18s, as is illustrated in FIG. 1. Similarly, the second retention capacitor line extension 18s2a and the second retention capacitor line extension 18s2b are connected at two positions: at the other position close to the retention capacitor line 18 and at the other tip section of the retention capacitor line extension 18s, as is illustrated in FIG. 1.

As illustrated in FIG. 1, the present embodiment shows, as one example, the arrangement in which the two retention capacitor line overpasses 18b are provided at two positions of the retention capacitor line extension 18, respectively. However, the number of the retention capacitor line overpasses 18b is not particularly limited but can be one or not less than three.

(Summary)

As described above, the retention capacitor line extension 18s of the present embodiment extends in the column direction Y while sandwiching the data signal line 15. The direction in which the retention capacitor line extension 18s extends is a direction away from the scanning signal line 16.

In planar view, the two retention capacitor line extensions 18s1a and s1b and the two retention capacitor line overpasses 18b form a rectangular enclosure enclosing a part of the data signal line 15.

(Sub-extension)

The following describes the retention capacitor line sub-extension 18c which is further extended from each retention capacitor line extension 18s.

The retention capacitor line sub-extension 18c is extended in the line direction X toward a corresponding drain drawing line 19 from a tip section of each retention capacitor line extension 18s.

The retention capacitor line sub-extension 18c is extended so as to intersect with the drain drawing line 19.

(Correction of Break)

In the active matrix substrate 5 of the present embodiment, each of the retention capacitor line extensions 18s and a corresponding retention capacitor line sub-extension 18c serve as a spare line for correction of a break. The following describes this, with reference to FIG. 1 which is a perspective plan view of the active matrix substrate 5.

(Region R1)

The following first describes correction of a break failure occurred on the data signal line 15 in a region R1 in FIG. 1.

Specifically, the break failure in this case is the one occurred in such a manner that a data signal line 15 is broken (a so-called S-disconnection) at, e.g., a broken point Br 1 indicated in FIG. 1.

(Cutting)

The correction is performed as below. First, a rectangular region, which is a region of the retention capacitor line extension 18s, is electrically separated from the retention capacitor line 18 (i.e., from the line part thereof extending in the line direction X) which rectangular region is sandwiched between the two overpasses crossing the data signal line 15 (i.e., between the two line parts of the retention capacitor line extension 18s which cross the data signal line 15).

That is, the rectangular region lying from one of the two retention capacitor line overpasses 18b to the other is electrically separated from the line part of the retention capacitor line 18.

Accordingly, the retention capacitor line 18 is cut at two sides (two positions) of the rectangular region. Specifically, the retention capacitor line 18 is cut at two positions: a cutting point C1 on the retention capacitor line extension 18s and a cutting point C2 on the retention capacitor line sub-extension 18c.

(Melting)

Then, each of the two retention capacitor line overpasses 18b and the data signal line 15 are connected with each other by melting at respective two positions so as to sandwich the broken point Br1 at which two positions the two retention capacitor line overpasses 18b intersect with the data signal line 15, i.e., each of the two retention capacitor line overpasses 18b and the data signal line 15 overlap each other. Thus, the two retention capacitor line overpasses 18b and the data signal line 15 are electrically connected with each other.

Specifically, the two melt connection points M1 and M2 indicated in FIG. 1 are melted so that the retention capacitor line extension s and the data signal line 15 are connected with each other.

(Bypass)

The correction operation makes it possible to transmit a data signal beyond the broken point Br 1 via a bypass indicated by the directional line D with double arrow in FIG. 1.

That is, the retention capacitor line extension 18s formed so as to enclose the outside of a region of the data signal line 15 serves as a bypass. Specifically, a bypass is provided on the broken data signal line 15 which bypass includes the two retention capacitor line overpasses 18b and the retention capacitor line extension 18s.

Accordingly, a data signal is transmitted beyond the break (broken point Br1) of the data signal line 15 via the bypass.

Thus, the bypass makes it possible to correct a break of the data signal line 15. This makes it possible to improve manufacturing yield of the active matrix substrate 5.

(Correction Step)

A concrete method for performing the cutting and melting (melt connection) in the step of correction is not particularly limited. For example, the method encompasses one using a laser.

For example, concretely, the cutting and melting can be performed by irradiating a surface of the active matrix substrate 5 with a laser. Laser light used in the laser irradiation is not particularly limited. For example, the laser light can be a YAG (yttrium aluminum garnet) laser. A wavelength to be used encompasses the fourth harmonic (wavelength: 266 nm) of a YAG laser.

In the cutting (destruction) and melt connection, it is also possible to irradiate a backside of the active matrix substrate 5 with a laser.

(Region R2)

The following describes correction of a break occurred on the data signal line 15 in a region R2.

The active matrix substrate 5 of the present embodiment allows not only correction of a break (broken point Br1) of the data signal line 15 in the region R1 but also correction of a break (broken point Br2) occurred in the region R2 indicated in FIG. 1. The following deals with a case where the data signal line 15 is broken at the broken point Br2 in FIG. 1.

(Cutting)

First, a line involved in the correction is electrically separated from the active matrix substrate 5.

Specifically, the two cutting points C3 and C4 on the retention capacitor line extension 18s, and the cutting point C5 on the drain drawing line 19 are cut by a method such as the one using a laser so that the line involved in the correction may be electrically separated.

Further, in the line part where the opening K is provided, the scanning signal line 16 is cut on both sides of the transistor 12, i.e., at the cutting points C6 and C7 indicated in FIG. 1. This makes it possible to electrically isolate the transistor 12 to be used in the correction from other transistors 12 and from the scanning signal line 16.

(Melting)

Then, connections are formed by melting (melt connection) in order that a bypass may be formed.

Concretely, melt connections are formed at the four melt connection points M3, M4, M5, and M6 indicated in FIG. 1.

That is, first, the broken data signal line 15 and the retention capacitor line overpass 18b are connected by melting at the melt connection point M3 where the data signal line 15 and the retention capacitor line overpass 18b overlap each other. This makes it possible to transmit a data signal from the data signal line 15 to the retention capacitor line sub-extension 18c via the retention capacitor line overpass 18b connected by melting with the data signal line 15.

Then, the retention capacitor line sub-extension 18c and the drain drawing line 19 are connected by melting at the melt connection point M4 where the retention capacitor line sub-extension 18c and the drain drawing line 19 overlap each other. This makes it possible to transmit the data signal toward the transistor 12 connected with the drain drawing line 19. As described above, the drain drawing line 19 is cut right before the contact hole 11 (i.e., cut at the cutting point C5). Therefore, the data signal cannot be transmitted to the pixel electrode 17 but is selectively transmitted only to the drain electrode 9 of the transistor 12.

Then, the drain electrode 9 of the transistor 12 and the scanning signal line 16 which serves as the gate electrode 10 are connected by melting at the melt connection point M5 where the drain electrode 9 and the scanning signal line 16 overlap each other.

Then, the scanning signal line 16 and the source electrode 8 of the transistor 12 are connected by melting at the melt connection point M6 where the scanning signal line 16 and the source electrode 8 overlap each other.

This makes it possible to transmit the data signal supplied to the drain electrode 9 to the source electrode 8 via the scanning signal line 16 serving as the gate electrode 10.

The source electrode 8 is connected with the broken data signal line 15.

Thus, the data signal is transmitted so as to bypasses the broken point Br2 on the data signal line 15. Specifically, the data signal is transmitted in order of: the data signal line 15, the melt connection point M3, the retention capacitor line overpass 18b, the retention capacitor line sub-extension 18c, the melt connection point M4, the drain drawing line 19, the drain electrode 9, the melt connection point M5, the gate electrode 10 (scanning signal line 16), the melt connection point M6, the source electrode 8, and the data signal line 15 (see the directional line E with double arrow in FIG. 1).

(Opening of Scanning Signal Line)

As described earlier, in the active matrix substrate 5 of the present embodiment, each of the scanning signal lines 16 has the openings K. The cutting of a scanning signal line 16 is carried out in its line part where an opening K is provided. Therefore, even if the scanning signal line 16 is cut for correction of a break, a scanning signal can be transmitted, in a normal fashion, to the transistors 12 using the scanning signal line 16 as respective gate electrodes 10, except for the transistor 12 in the line part.

This is because the scanning signal can be transmitted via the scanning signal line 16 on a side of the opening K where no cutting is performed.

Thus, the active matrix substrate 5 of the present embodiment allows correction of a break occurred in the region R2.

An order of connecting the melt connection points by melting is not particularly limited to the aforementioned order but can be freely changed.

(Description Based on Cross-sectional View)

The following adds descriptions of the correction based on a cross-sectional view to the descriptions thereof based on the planar view. Specifically, with reference to FIGS. 2 and 3, the following takes, as an example, a break occurred on the data signal line 15 in the region R2, in order to describe how the correction is performed.

(Cross-sectional Structure: Sub-extension)

Figure 2:
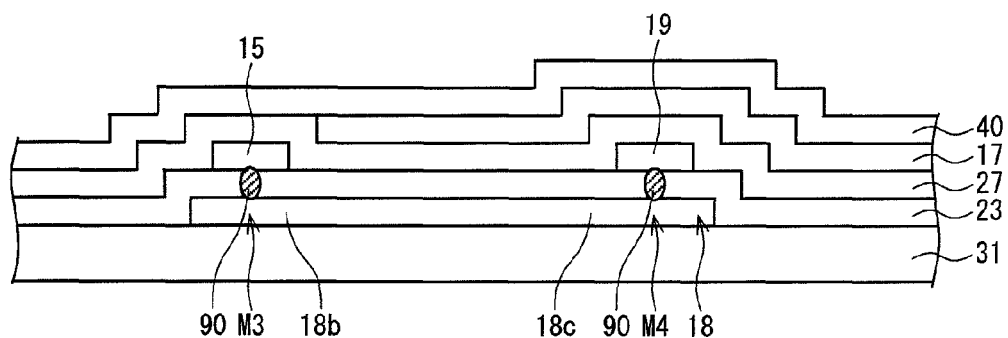
FIG. 2

The following describes a layered structure of the active matrix substrate 5 of the present embodiment, with reference to FIG. 2. FIG. 2 is a cross-sectional view taken along a line A-A in FIG. 1. The cross-sectional view illustrates a layered structure where the melt connection etc. are performed in the correction in the region R2.

As illustrated in FIG. 2, in the active matrix substrate 5 of the present embodiment, the retention capacitor line 18 (the retention capacitor line overpass b and the retention capacitor line sub-extension 18c) is formed on a substrate (transparent insulating substrate) 31, and a gate insulating film 23 is formed the retention capacitor line 18.

Formed on the gate insulating film 23 are the data signal line 15 and the drain drawing line 19. Formed thereon is an interlayer insulating film 27. The interlayer insulating film 27 is, e.g., a passivation film made from an inorganic material.

The pixel electrode 17 is formed on the interlayer insulating film 27. Formed thereon is an alignment film 40.

As illustrated in FIG. 2, the data signal line 15 and the drain drawing line 19 are formed at a same layer level. The layer is a different one from the layer of the retention capacitor line 18. The retention capacitor line 18 is formed at the same level as the layer of the scanning signal line 16 (not illustrated) which layer is the lowermost layer in the active matrix substrate 5.

(Correction)

The shaded oval areas illustrated in FIG. 2 indicate melt connections 90.

As illustrated in FIG. 2, the gate insulating film 23 is formed between the data signal line 15 and the retention capacitor line overpass 18b which are to be connected with each other at the melt connection point M3. Therefore, the melt connection is formed by use of the laser by destroying and/or penetrating the gate insulating film 23.

As is the case with the melt connection point M3, the gate insulating film 23 is also formed between the retention capacitor line sub-extension 18c and the drain drawing line 19 at the melt connection point M4. Therefore, the melt connection is also formed at the melt connection point M4 by penetrating the gate insulating film 23.

(Cross-sectional Structure: Transistor)

Figure 3:
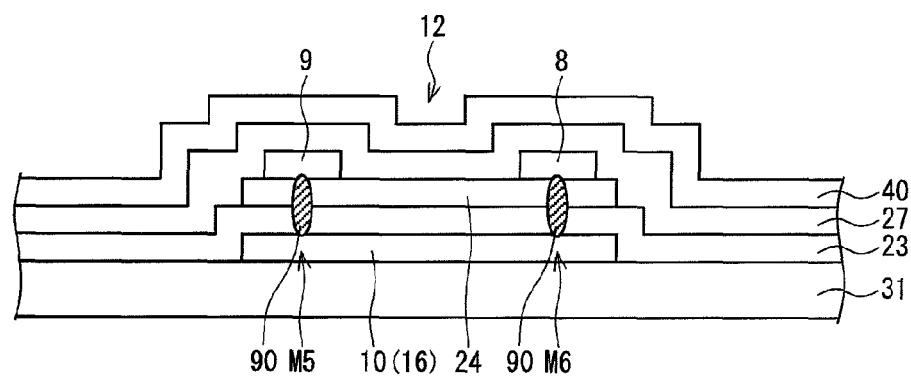
FIG. 3

The following describes, a layered structure of one of the transistors 12 of the active matrix substrate 5 of the present embodiment, with reference to FIG. 3. FIG. 3 is a cross-sectional view taken along a line B-B in FIG. 1.

As illustrated in FIG. 3, in that part of the active matrix substrate 5 of the present embodiment in which the transistor 12 is formed, the scanning signal line 16 which serves as a gate electrode 10 is formed on the substrate (transparent insulating substrate) 31, and the gate insulating film 23 is formed thereon. Further, a semiconductor layer 24 is formed, via the gate insulating film 23, as an upper layer positionally corresponding to the gate electrode 10.

Further, the drain electrode 9 and the source electrode 8 are formed on the semiconductor layer 24. The interlayer insulating film 27 is formed thereon so as to entirely cover the semiconductor layer 24, the drain electrode 9, and the source electrode 8.

The alignment film 40 is formed on the interlayer insulating film 27.

(Correction Illustrated in Cross-sectional View)

As is the case with the melt connection points M3 and M4 which are described above with reference to FIG. 2, melt connections are also formed in the part where the transistor 12 is formed.

In FIG. 3, the shaded oval areas indicate melt connections 90, as is the case with FIG. 2. As illustrated in FIG. 3, the gate insulating film 23 and the semiconductor layer 24 are formed, at the melt connection point M5, between the drain electrode 9 and the scanning signal line 16 serving as a gate electrode 10 which are to be connected with each other.

Therefore, the melt connection is formed by use of a laser by penetrating not only the gate insulating film 23 but also the semiconductor layer 24.

As is the case with the melt connection point M5, the gate insulating film 23 and the semiconductor layer 24 are formed, at the melt connection point M6, between the gate electrode 10 and the source electrode 8.

Therefore, the melt connection is formed at the melt connection point M5 by penetrating the gate insulating film 23 and the semiconductor layer 24.

Thus, the active matrix substrate 5 and a liquid crystal panel having the active matrix substrate 5 make it possible to correct a break occurred on a data signal line 15, as is illustrated in FIGS. 2 and 3.

(Manufacturing Method)

The following describes one example of a method for manufacturing the active matrix substrate 5.

(Lowermost Layer: Scanning Signal Line and Retention Capacitor Line)

First, (i) a metal film made from a metal such as titan, chrome, aluminum, molybdenum, tantalum, tungsten, or copper, (ii) an alloy film made from at least two of the metals, or (iii) a laminated film made from at least two of the metals is formed, by a method such as sputtering, so as to have a film thickness of 1000 Å to 3000 Å, on a transparent insulating substrate (substrate 31) made from a material such as grass and plastic. The resulting film is patterned by photo etching so as to have a required pattern, thereby forming (i) the scanning signal lines 16 serving as respective gate electrodes 10 of the transistors 12, and (ii) the retention capacitor lines 18. Specifically, formed are the retention capacitor line extensions 18s, the retention capacitor line overpasses 18b, the retention capacitor line sub-extensions 18c, retention capacitor electrodes, etc.

(Gate Insulating Film)

Then, a silicon nitride film (SiNx) to be used as the gate insulating film 23, a high-resistance semiconductor layer made from amorphous silicon, polysilicon, or the like, and a low-resistance semiconductor layer made from n+amorphous silicon or the like are continuously formed by a method such as plasma CVD (Chemical Vapor Deposition). Then, patterning of the film and layers is performed by photo etching.

The silicon nitride film to be used as the gate insulating film 23 has a film thickness of, e.g., approximately 3000 Å to 5000 Å. The amorphous silicon film to be used as the high-resistance semiconductor layer has a film thickness of, e.g., approximately 1000 Å to 3000 Å. The n+amorphous silicon film to be used as the low-resistance semiconductor layer has a film thickness of, e.g., approximately 400 Å to 700 Å.

(Data Signal Line and Drain Drawing Line)

Then, (i) the metal film made from a metal such as titan, chrome, aluminum, molybdenum, tantalum, tungsten, or copper, (ii) the alloy film made from at least two of the metals, or (iii) the laminated film made from at least two of the metals is formed is formed by a method such as sputtering so as to have a film thickness of 1000 Å to 3000 Å. Then, the resulting film is patterned by photo etching or the like so as to have a required pattern, thereby forming the data signal lines 15, the source electrodes 8, the drain electrodes 9, the drain drawing lines 19, etc.

(Semiconductor Layer)

Then, channel etching of the high-resistance semiconductor layer (i layer) such as an amorphous silicon film and the low-resistance semiconductor layer (n+layer) such as an n+amorphous silicon film is performed by dry etching by using, as a mask, patterns of the data signal lines 15, the source electrodes 8, the drain electrode 9, etc.

The process optimizes the film thickness of the i layer, thereby forming respective channel regions (semiconductor layer 24) of the transistors 12. In the process, the semiconductor layer 24 which is not masked is removed by etching while the i layer is left which has the optimized film thickness required for performance of the transistors 12.

(Interlayer Insulating Film)

Then, an inorganic insulating film made from a material such as silicon nitride and oxide silicon is formed as an interlayer insulating film 27 so as to cover the data signal lines 15, the source electrodes 8, the drain electrodes 9, etc. In the present embodiment, a silicon nitride film (passivation film) having a thickness of approximately 2000 Å to 5000 Å is formed by a method such as plasma CVD.

(Contact Hole)

The interlayer insulating film 27 is etched in accordance with positions of the contact holes 11, thereby forming holes. In the present embodiment, for example, a photosensitive resist is patterned by photolithography (exposure and development) so as to be then etched.

(Pixel Electrode)

Then, a conductive film having transparency made from a material such as ITO (indium tin oxide), IZO, zinc oxide, and tin oxide is formed by a method such as sputtering so as to have a film thickness of approximately 1000 Å to 2000 Å. Then, the resulting conductive film is patterned by photo etching or the like so as to have a required pattern, thereby forming a first pixel electrode 17 and a second pixel electrode 17 in each of the pixel regions 3.

(Alignment Film)

Then, the alignment film 40 is formed in such a manner that a polyimide compound for example is applied by a method such as an ink-jet method and a printing method so as to cover the first pixel electrode 17 and the second pixel electrode 17.

(Inspection)

Then, the active matrix substrate 5 is inspected. That is, whether or not a data signal line 15 is broken is checked, and if a break is found, the break is corrected by the method described with reference to FIGS. 1 through 3.

The active matrix substrate 5 of the present embodiment is made through the aforementioned steps.

(Assembling Etc.)

Further, the active matrix substrate 5 is assembled with a color filter substrate. Then, liquid crystal is filled and sealed therein, thereby making the liquid crystal panel. In the color filter substrate, colored layers (RGB) and black matrixes each provided between two colored layers are formed on a transparent insulating substrate. Counter electrodes (common electrodes) are formed thereon. Further, an alignment film is formed thereon.

(Inspection)

As described above, it is possible to check the active matrix substrate 5 as to whether or not a data signal line 15 is broken. Alternatively, the completed liquid crystal panel can be checked.

Figure 4:
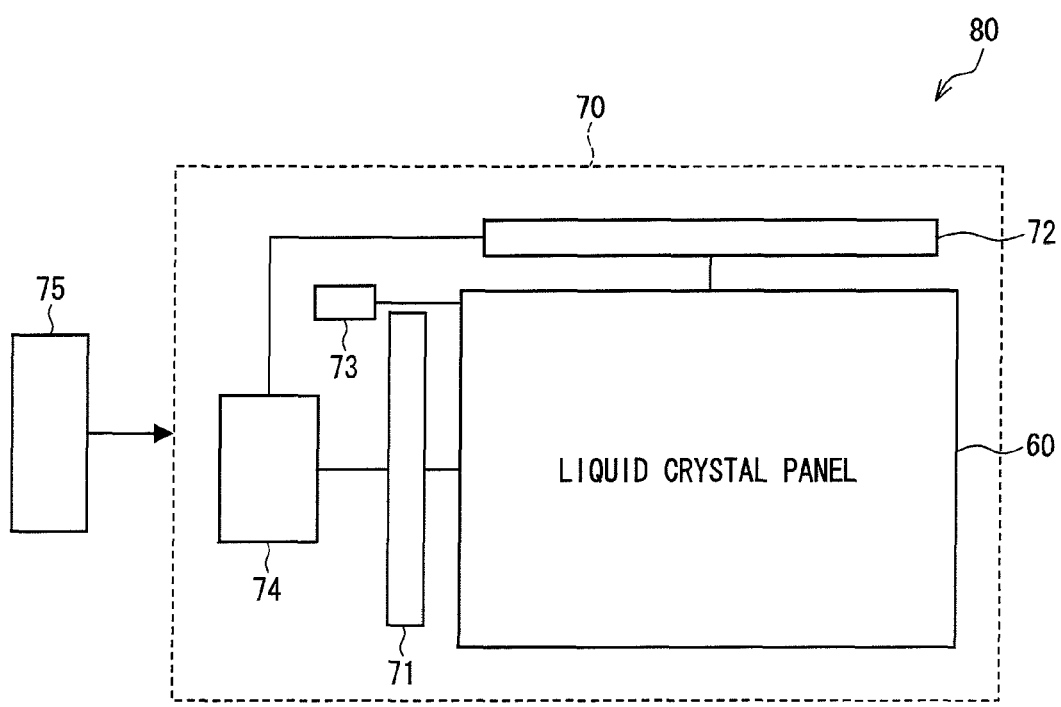
FIG. 4
Figure 5:
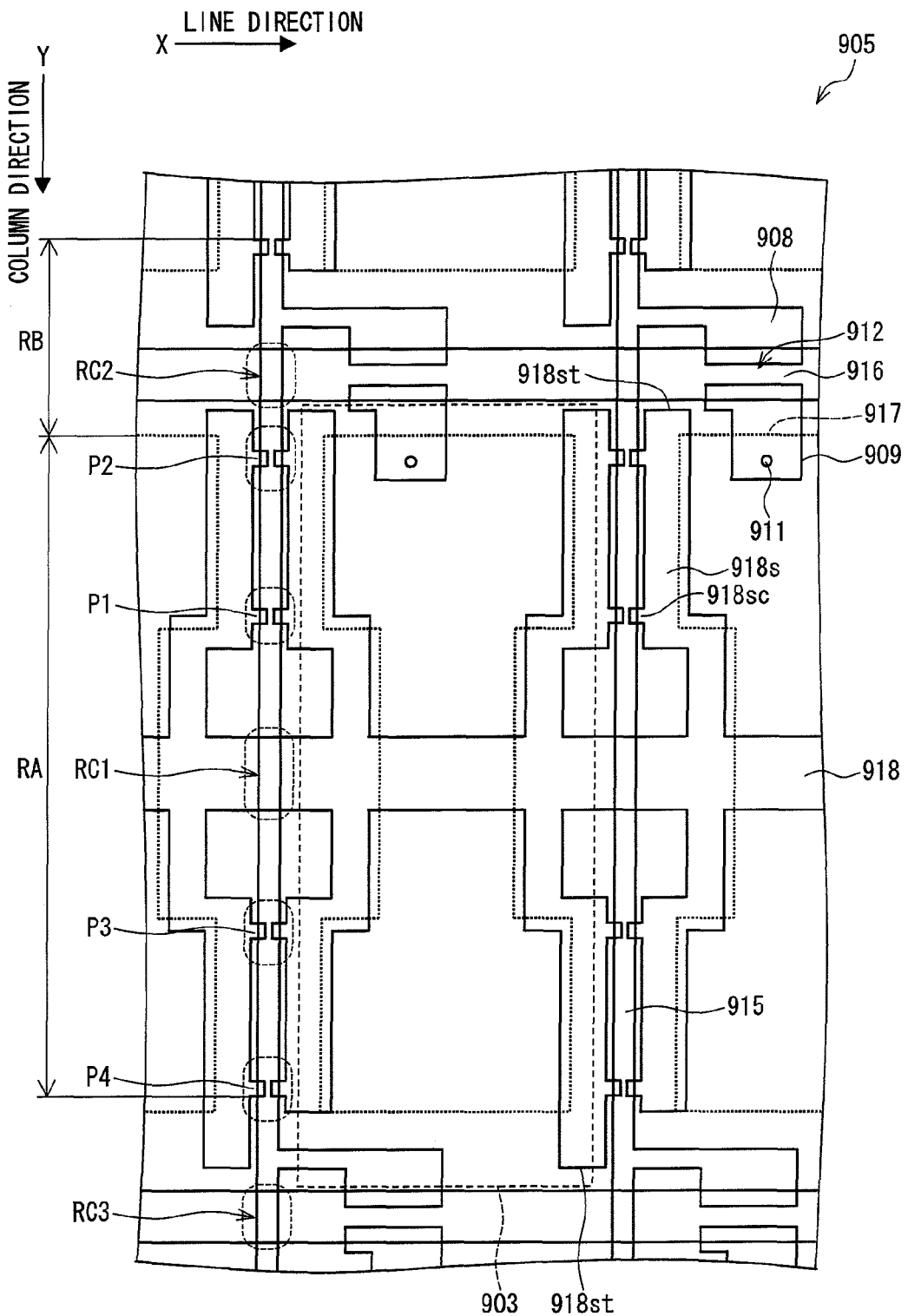
FIG. 5

In a case where the completed liquid crystal panel is checked as to whether or not a data signal line 15 is broken, a display action is performed after a source driver 72 and a gate driver 71 are connected with or mounted to the liquid crystal panel as is illustrated in FIG. 4. If a data signal line 15 has a break, a backside of the liquid crystal panel (a surface on a side of the transparent insulating substrate (substrate 31) of the active matrix substrate is irradiated with a laser, thereby correcting the break as is illustrated in FIGS. 1 through 3.

FIG. 4 is a block diagram illustrating an arrangement of a liquid crystal display apparatus 70 of the present invention and an arrangement of a television receiver 80 of the present invention. As illustrated in FIG. 4, the television receiver 80 of the present invention includes, as its main components, a tuner section 75 and the liquid crystal display apparatus 70 having a liquid crystal panel 60 which has the active matrix substrate 5 of the present invention.

In addition to the liquid crystal panel 60, the liquid crystal display apparatus 70 includes the source driver 72 and the gate driver 71 which are drivers for driving the liquid crystal panel 60. The source driver 72 and the gate driver 71 are connected with a control device 74 for controlling the drivers. In addition to the drivers, a Cs driving circuit 73 is connected with the liquid crystal panel 60.

The present invention is not limited to the embodiment described above, and may be modified within the scope of the claims. An embodiment based on a proper combination of technical means disclosed in different embodiments is also encompassed in the technical scope of the present invention.

For example, another embodiment can be such that the drain drawing line 19 is cut at the cutting point C5, and then, the drain drawing line 19 and the retention capacitor line 18 are electrically connected with each other so that the break (broken point Br2) occurred in the region R2 is corrected.

Specifically, as illustrated in FIG. 1, the drain drawing line 19 is formed in advance so as to have a region where the drain drawing line 19 and the retention capacitor line 18 overlap each other. In a case where the drain drawing line 19 is cut as described above in order that the break may be corrected, the drain drawing line 19 and the retention capacitor line 18 are electrically connected, by, e.g., melting, with each other in the region.

This makes it possible to control, via the retention capacitor line 18, an electric potential of the pixel electrode 17 which is electrically floating (i.e., the electric potential cannot be controlled) due to the cutting of the drain drawing line 19.

As a result, a pixel corresponding to the pixel electrode 17 can be controlled so as to have a constant brightness such as that of a gray point.

Industrial Applicability

Since the liquid crystal panel and the liquid crystal display apparatus of the present invention allows correction of a break, the liquid crystal panel and the liquid crystal display apparatus is suitably used in, e.g., a large liquid crystal television and a high-definition liquid crystal television.

The invention claimed is:

1. An active matrix substrate comprising:
scanning signal lines and retention capacitor lines both extending in a first direction;
data signal lines extending in a second direction intersecting with the first direction; and
pixel regions in each of which:
a corresponding one of the scanning signal lines crosses the pixel region;
at least one pixel electrode is provided on one of both sides, extending along a longitudinal direction of the corresponding one of the scanning signal lines, of the corresponding one of the scanning signal lines while at least one pixel electrode is provided on a counter side; and
transistors are provided on the corresponding one of the scanning signal lines so as to correspond respectively to the pixel electrodes,
wherein:
each of the retention capacitor lines has a retention capacitor line extension extending along a corresponding one of the data signal lines from an intersection of this retention capacitor line and the corresponding one of the data signal lines toward each of two intersections of the corresponding one of the data signal lines and two scanning signal lines adjacent to this retention capacitor line;

the retention capacitor line extension has a part where the retention capacitor line extension and the corresponding one of the data signal lines overlap each other in planar view;

drain drawing lines are provided for electrically connecting drains of the transistors with the pixel electrodes, respectively;

the retention capacitor line extension has a sub-extension extending toward a corresponding one of the drain drawing lines;

the sub-extension has a part where the sub-extension and the corresponding one of the drain drawing lines overlap each other in planer view;

each of the scanning signal lines has openings which positionally correspond respectively to the transistors provided to this scanning signal line, the openings each extending from an inside of a corresponding one of the pixel regions to an outside thereof beyond a corresponding one of the data signal lines; and on at least the one of both sides of each opening, each of the scanning signal lines has a part functioning as a gate electrode of a corresponding one of the transistors.

2. The active matrix substrate as set forth in claim 1, wherein in planar view, each of the retention capacitor line extensions and the corresponding one of the data signal lines overlap each other at at least two different positions in a direction in which the data signal line extends.

3. A liquid crystal panel comprising an active matrix substrate as set forth in claim 1.

4. A liquid crystal display apparatus comprising a liquid crystal panel recited in claim 3.

5. A television receiver comprising:
a liquid crystal display apparatus as set forth in claim 4; and
a tuner section for receiving a television broadcast.

* * * * *